United States Patent [19]

Sasaki et al.

[11] Patent Number: 5,521,024
[45] Date of Patent: May 28, 1996

[54] LEAD ACID STORAGE BATTERY

[75] Inventors: Masaaki Sasaki; Masahiro Arakawa; Tohru Horii; Kazuo Murata, all of Takatsuki, Japan

[73] Assignee: Yuasa Corporation, Osaka, Japan

[21] Appl. No.: 409,524

[22] Filed: Mar. 24, 1995

[30] Foreign Application Priority Data

Mar. 24, 1994 [JP] Japan ................... 6-053706

[51] Int. Cl.⁶ .................................................. H01M 6/12
[52] U.S. Cl. .................. 429/162; 429/130; 429/152; 429/153; 429/161; 429/163; 429/185
[58] Field of Search ...................... 429/161, 162, 429/163, 130, 152, 153, 185

[56] References Cited

U.S. PATENT DOCUMENTS 4,548,880  10/1985  Suzuki et al. .......................... 429/162
5,227,260  7/1993  Rose et al. ............................. 429/54
5,401,595  3/1995  Kagawa et al. ......................... 429/152

*Primary Examiner*—Stephen Kalafut
*Assistant Examiner*—Richard H. Lilley, Jr.
*Attorney, Agent, or Firm*—Evenson, McKeown, Edwards & Lenahan

[57] ABSTRACT

A lead acid storage battery has a cell composed of a positive plate comprising a positive active material layer and a positive current collector plate, a negative plate comprising a negative active material layer and a negative current collector plate, a separator and a frame-shaped gasket. In the cell, the positive plate and the negative plate are laminated with the gasket put between them. The gasket is in contact with peripheral edges of the positive current collector plate and the negative current collector plate. The positive active material layer and the negative active material layer are located in a cell space surrounded by both of the plates and the gasket with the separator put between them.

7 Claims, 6 Drawing Sheets

LEAD ACID STORAGE BATTERY

BACKGROUND TITLE OF THE INVENTION

This invention relates to a lead acid storage battery and especially to a sealed-type lead acid storage battery.

A general lead acid storage battery has so far been made by inserting assembled plate groups into a container and bonding a cover onto the container. The container has generally been made by forming and working synthetic resin into a boxed shape. In this lead acid storage battery, adjoining cells have generally been connected to each other by a connecting conductor installed on top of a partition wall of the container. In this lead acid storage battery, however, the container has had to be made by fabricating an expensive metal mold for every change in battery size resulting in high cost and low productivity. Further, there have been problems such as increases in weight, volume and electrical resistance of connecting parts of cells.

On the other hand, a demand for a sealed-type lead acid storage battery with high energy density has been increasing in recent years, and a mono-block-type sealed-type lead acid storage battery is proposed as disclosed, for example, in Published Japanese Patent Application (KOKAI) no. 62-80973. This lead acid storage battery is fabricated by joining two half containers 100 opposing each other as illustrated in FIG. 12. The half container 100 contains three cells 101, 102 & 103 as illustrated in FIG. 13. As for the adjoining cells 101 & 102, a positive current collector 104 is connected to a negative current collector 105 by a connecting conductor 106. The connecting conductor 106 pierces through a partition wall 107. Since the cells are connected to each other at a middle part of the current collectors in this lead acid storage battery, it has features such as (i) the electrical resistance becomes small, and (ii) the weight and volume of the connecting conductor can be reduced as compared with a case where plate lugs are connected each other. However, there have been the following problems (1) to (4):

(1) A process for integrally molding the half container to the current collector, is required.

(2) A process for bonding the half containers to each other, is required.

(3) Since the current collectors are buried in the half containers, heat releasing ability is bad so that a battery temperature is apt to rise.

(4) It is difficult to fabricate the cells by using three or more plates.

SUMMARY OF THE INVENTION

A first object of this invention is to provide a lead acid storage battery which can be made easily by eliminating the necessity for molding a container using a metal mold.

A second object of this invention is to provide a lead acid storage battery, in which an exhaust structure having exhaust ports can be formed easily.

A third object of this invention is to provide a lead acid storage battery, in which the number of steps in the constructional process is reduced to improve its productivity and stability of separator the can be improved.

A fourth object of this invention is to provide a lead acid storage battery with a good heat releasing characteristic.

A fifth object of this invention is to provide a lead acid storage battery with a good heat releasing characteristic that is able to avoid electrical short-circuiting.

A sixth object of this invention is to provide a lead acid storage battery, in which battery capacity can be increased easily and cells can be connected easily.

A seventh object of this invention is to provide a lead acid storage battery, in which battery capacity can be increased easily.

In order to accomplish the first object, a first embodiment of this invention provides a lead battery having a cell composed of a positive plate comprising a positive active material layer and a positive current collector plate, a negative plate comprising a negative active material layer and a negative current collector plate, a separator and a frame-shaped gasket. In the cell, the positive plate and the negative plate are laminated with the gasket put between them, the gasket is in contact with peripheral edges of the positive current collector plate and the negative current collector plate, and the positive active material layer and the negative active material layer are located in a cell space surrounded by both of the plates and the gasket with the separator put between them.

In order to accomplish the second object, a second embodiment of this invention uses the following structure in the above first embodiment. The cell space comprises one space, and an exhaust port for connecting the cell space to an external space is made piercing through at least one of the positive current collector plate and the negative current collector plate. Alternatively the cell space comprises two spaces partitioned by the separator, an exhaust port for connecting the cell space to the external space is made piercing through at least one of the positive current collector plate and the negative current collector plate, and an air vent hole for connecting the two spaces is made piercing through the separator.

In order to accomplish the third object, a third embodiment of this invention uses the following structure in the above first embodiment. The gasket is formed integrally with the separator.

In order to accomplish the fourth object, a fourth embodiment of this invention uses the following structure in the above first embodiment. At least a part of each peripheral edge of the positive current collector plate and the negative current collector plate protrudes out of the gasket, and the protruding portion functions as a single-purpose heat releasing fin or as a heat releasing fin serving also as a terminal.

In order to accomplish the fifth object, a fifth embodiment of this invention uses the following structure in the above fourth embodiment. A protruding length of the heat releasing fin serving also as terminal is different from that of the single-purpose heat releasing fin.

In order to accomplish the sixth object, a sixth embodiment of this invention uses the following structure in the above embodiment. Multiple cells are put in side-by-side positions, adjoining cells are put in reversed upside down and downside up positions alternately, a positive current collector plate of each cell is connected to a negative current collector plate of the adjoining cell so that the cells are connected in series, and the current collector plates connected to each other are composed of one current collector plate. In another embodiment, multiple cells are installed in side-by-side positions, adjoining cells are put in the same upside up and downside down positions, positive current collector plates of adjoining cells are connected to each other and negative current collector plates of adjoining cells are connected to each other, and the current collector plates connected to each other are composed of one current collector plate. In yet another embodiment, multiple cells are installed in laminated positions, cells adjoining in a vertical direction are in the same upside up and downside down positions; and in these cells adjoining in a vertical direction, a current collector plate located at an upper side of the lower cell and a current collector plate located at a lower side of the upper cell are made up integrally and connected to each other by bending one current collector plate.

In order to accomplish the seventh object, a seventh embodiment of this invention uses the following structure in the above first embodiment. The battery has multiple laminated assemblies comprising multiple cells put side-by-side.

DETAILED DESCRIPTION OF THE PREFERRED EMBODIMENTS

Figure 1:
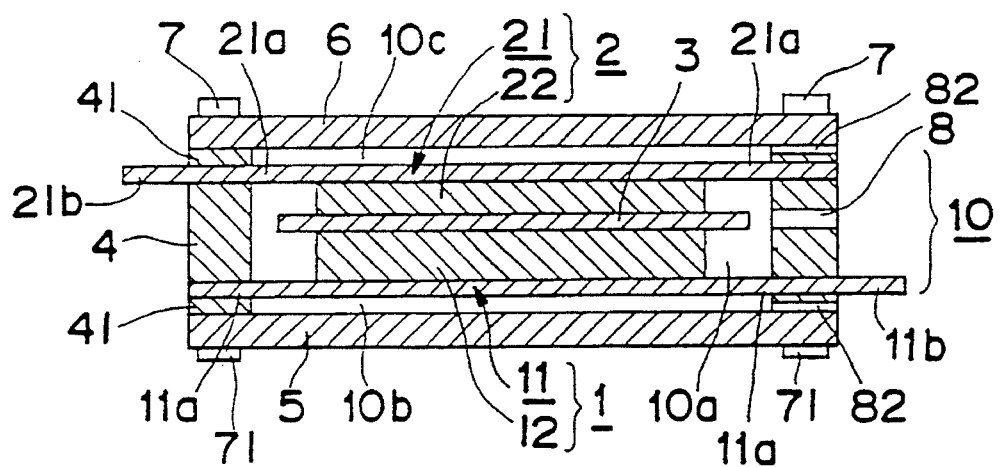
FIG. 1 is a sectional side view of a lead acid storage battery of embodiment 1.
Figure 2:
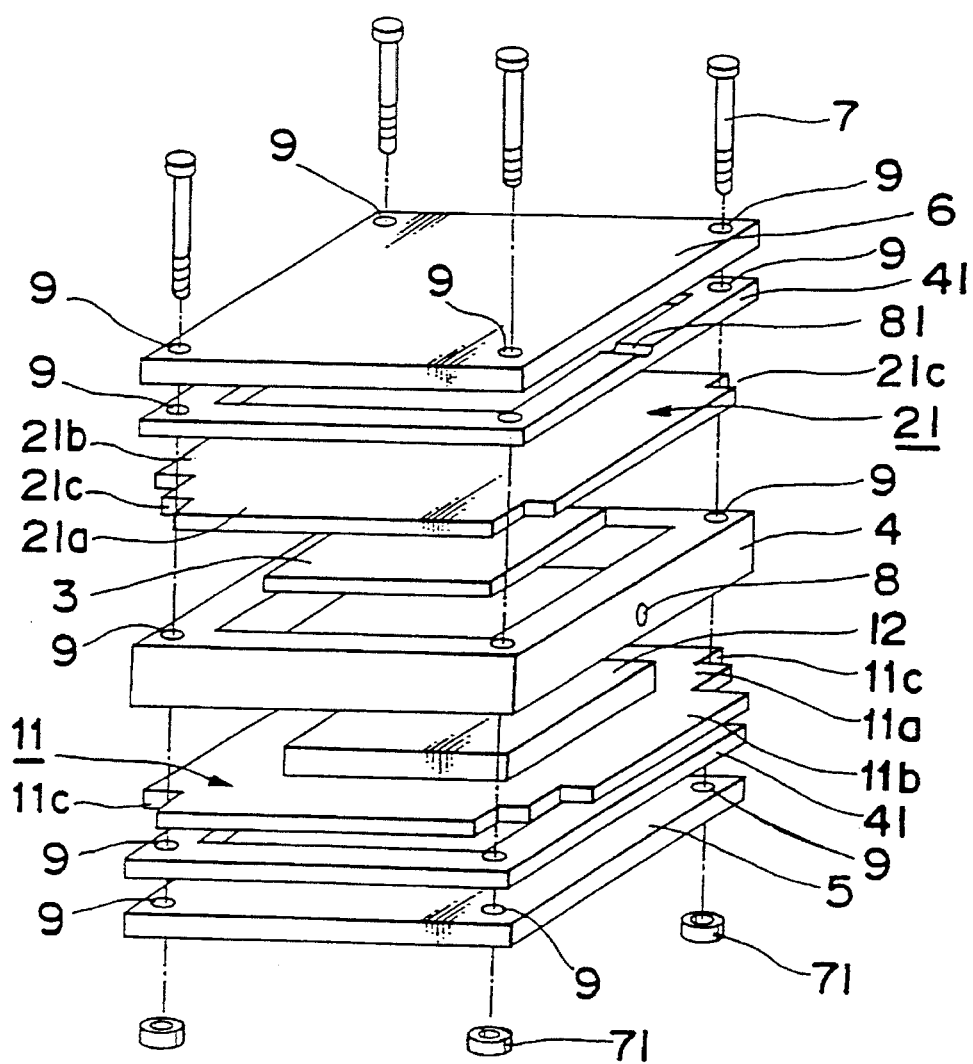
FIG. 2 is an exploded view of the same shown in perspective.

FIG. 1 is a sectional side view showing the lead acid storage battery of a first embodiment and FIG. 2 is an exploded view of the same shown in perspective. In this lead acid storage battery, a cell 10 composed of a positive plate 1, a negative plate 2, a separator 3 and a gasket 4 is held between covers 5 & 6, and is secured by bolts 7 and nuts 71.

The positive plate 1 comprises a positive current collector plate 11 and a positive active material layer 12, and the negative plate 2 comprises a negative current collector plate 21 and a negative active material layer 22. Both of the current collector plates 11 & 12 are made of a lead alloy foil having a thickness of 0.2 mm. The positive active material layer 12 is attached to one side face of the positive current collector plate 11 with a peripheral edge 11a of the positive current collector plate 11 left unattached. The negative active material layer 22 is attached to one side face of the negative current collector plate 21 with a peripheral edge 21a of the negative current collector plate 21 left unattached. The gasket 4 is a square frame body made of synthetic rubber. The covers 5 & 6 are plates.

The cell 10 is made by laminating the positive plate 1 and the negative plate 2 with the gasket 4 put between them. The gasket 4 is in contact with the peripheral edges 11a & 21a of the positive current collector plate 11 and the negative current collector plate 21. The positive active material layer 12 and the negative active material layer 22 are located in a cell space 10a surrounded by the positive current collector plate 11, the negative current collector plate 21 and the gasket 4 with the separator 3 put between them. The separator 3 has such a size as not contact with an inside surface of the gasket 4.

A part of the peripheral edge 11a of the positive current collector plate 11 protrudes out of the gasket 4, and this protruding portion 11b forms a positive terminal. A part of the peripheral edge 21a of the negative current collector plate 21 protrudes out of the gasket 4 and toward a side opposite to the protruding portion 11b, and this protruding portion 21b forms a negative terminal.

The covers 5 & 6 make contact with the cell 10 through a thin gasket 41 from upper and lower sides, and are pressed on and secured to it by bolts 7. The bolts 7 pierce through the covers 5 & 6, both of the gaskets 41 and the gasket 4. Notches 11c and 21c are made on four corners of both of the current collector plates 11 & 21, and the bolts 7 pass these notches 11c and 21c.

An exhaust port 8 connecting the cell space 10a to the external space is made on the longitudinal middle and the vertical middle part of one side of the gasket 4. An exhaust groove 81 (FIG. 2) is formed on the longitudinal middle part of one side of the gasket 41, and an exhaust port 82 comprising the exhaust groove 81 is made between the gasket 41 and the covers 5 & 6.

The lead acid storage battery having the above structure is made according to the following procedures. The gasket 41, the positive plate 1, the gasket 4, the separator 3, the negative plate 2, the gasket 41 and the cover 6 are laminated on the cover 5 in this order, as illustrated in FIG. 2. The bolts 7 are passed through bolt holes 9 previously made at four corners of the covers 5 & 6, both of the gaskets 41 and the gasket 4. The nuts 71 are screwed onto threaded ends of the bolts 7 so as to tighten the laminated components in a vertical direction.

According to the lead acid storage battery having the above structure, the cell 10 is fabricated easily by only laminating the positive plate 1 and the gasket 4 and the negative plate 2, so that it is not necessary to form the container by using a metal mold as in conventional cases. Therefore, the lead acid storage battery can be made easily. In addition, lead acid storage batteries having different sizes can be made easily because sizes of the positive plate 1, the gasket 4, the negative plate 2, the separator 3 and the covers 5 & 6 can be changed easily. Consequently, the lead acid storage battery having the above structure has an advantage in multi-product short-run production. It is not required to install a separate take-out terminal because the protruding portions 11b & 21b function as terminals. Further, the rise of battery temperature can be controlled because the protruding portions 11b & 21b function not only as the terminals but also as heat releasing fins. Therefore, its heat releasing characteristic is excellent.

Figure 3:
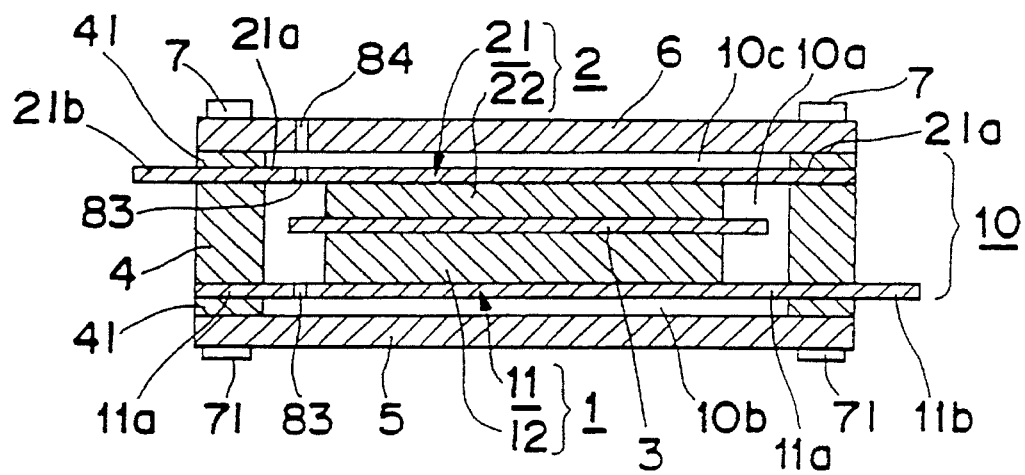
FIG. 3 is sectional side view of a lead acid storage battery according to embodiment 2.

FIG. 3 is the sectional side view showing the lead acid storage battery of a second embodiment. This lead acid storage battery has the same structure as that of the first embodiment and also has exhaust ports. In this lead acid storage battery, exhaust ports 83 are made piercing through the positive current collector plate 11 at a part of the peripheral edge 11a which is not in contact with the gasket 4 and at a part of the peripheral edge 21a of the negative current collector plate 21 which is not in contact with the gasket 4, and an exhaust port 84 is made piercing through the cover 6. Through these exhaust ports 83 & 84, the space 10b between the cover 5 and the positive current collector plate 11, the cell space 10a and the space 10c between the cover 6 and the negative current collector plate 21 connect to the external space. Therefore, gas produced in the spaces 10a, 10b and 10c can be exhausted outside through the exhaust ports 83 & 84.

According to the lead acid storage battery having the above structure, the exhaust ports can be made easily as compared with the first embodiment. Namely, the exhaust port 8 can not be made easily because the gasket 4 is thin in the embodiment. However, the making of exhaust ports 83 & 84 is not as difficult as compared with the first embodiment because the ports are made on the covers and current collector plates in this embodiment.

Figure 4:
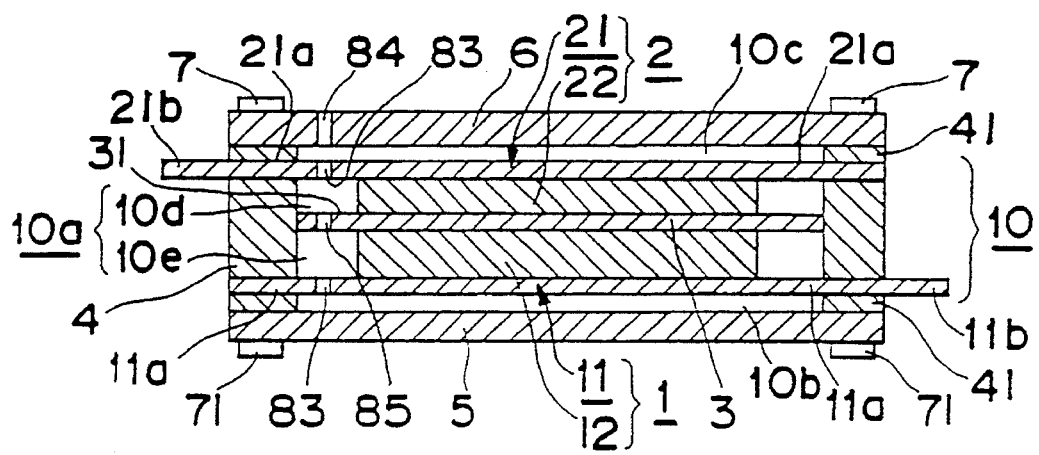
FIG. 4 is a sectional side view of a lead acid storage battery of embodiment 3.

FIG. 4 is the sectional side view showing the lead acid storage battery of a third embodiment. In this lead acid storage battery, the peripheral edge of the separator 3 is in contact with an inside surface of the gasket 4 and the cell space 10a is divided into two independent spaces 10d & 10e. An air vent hole 85 is made piercing through a part (peripheral edge) 31 where the separator 3 is not in contact with the active material layers 12 & 22. Other compositions are the same as those of the second embodiment (FIG. 3). The space 10b, the space 10e, the space 10d and the space 10c connect to the external space through the exhaust ports 83 & 84 and the air vent hole 85. Therefore, gas produced in the spaces 10b, 10c, 10d and 10e can be exhausted outside through the exhaust ports 83 & 84 and the air vent hole 85.

According to the lead acid storage battery having the above structure, since the air vent hole 85 is made on the separator 3 and the exhaust ports 83 & 84 are made on the cover 6 and the current collector plates 11 & 12, the exhaust structure having the exhaust ports can be formed easily in the same way as the second embodiment even in the case of the battery having the structure wherein the cell space 10a is divided by the separator 3.

Figure 5:
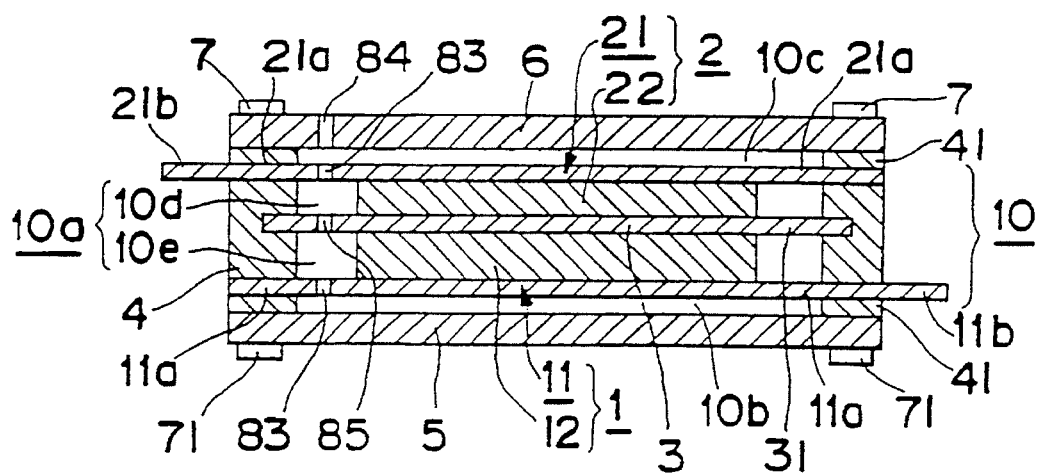
FIG. 5 is a sectional side view of a lead acid storage battery of embodiment 4.

FIG. 5 is the sectional side view showing the lead acid storage battery of a fourth embodiment. In this lead acid storage battery, the separator 3 is formed integrally with the gasket 4. Specifically, the gasket 4 is formed integrally on the peripheral edge of the separator 3. The separator 3 is preferably fabricated into a structure wherein a glass mat is attached to a central part of a reticulated plate. According to this structure, the gasket 4 is integrated to the peripheral edge with good adhesion because the peripheral edge of the separator 3 is reticulated. Other compositions are the same with those of the third embodiment (FIG. 4).

According to the lead acid storage battery having the above structure, a number of steps in the process of making a lead acid storage battery can be reduced and the process productivity can be improved because it is not required to put the separator 3 and the gasket 4 one upon another. In addition, stability of the separator 3 can be improved and earthquake resistance can be made better.

Figure 6:
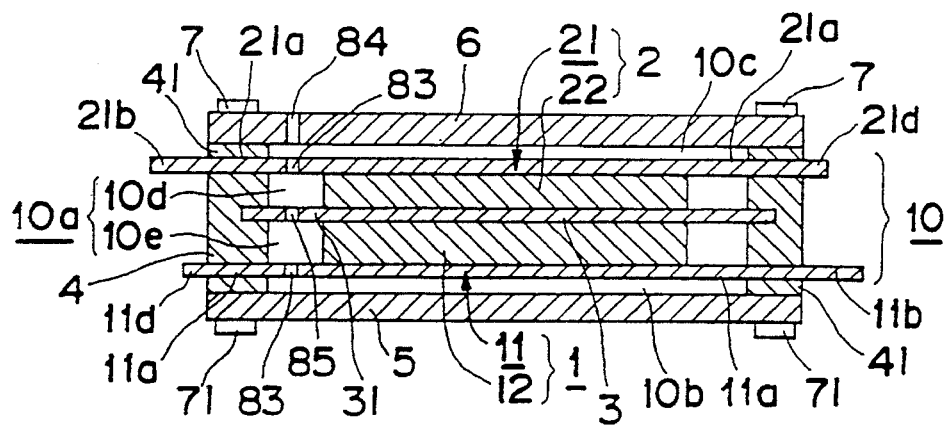
FIG. 6 is a sectional side view of a lead acid storage battery of embodiment 5.

FIG. 6 is the sectional side view showing the lead acid storage battery of a fifth embodiment. In this lead acid storage battery, the peripheral edge 11a of the positive current collector plate 11 protrudes out of the gasket 4 (protruding portion 11d) at a part other than the protruding portion 11b and the peripheral edge 21a of the negative current collector plate 21 protrudes out of the gasket 4 (protruding portion 21d) at a part other than the protruding portion 21b. Protruding lengths of the protruding portions 11d & 21d are set shorter than those of the protruding portions 11b & 21b. Other compositions are the same with those of a fourth embodiment (FIG. 5).

According to the lead acid storage battery having the above structure, the rise of battery temperature can be controlled better than the first through fourth embodiments because not only the protruding portions 11b & 21b but also the protruding portions 11d & 21d function as the heat releasing fins. Therefore, the heat releasing characteristic is excellent. The protruding portion 11d does not contact with the protruding portion 21b and the protruding portion 21d does not contact with the protruding portion 11b, because the protruding lengths of the protruding portions 11d & 21d are made different from the protruding lengths of the protruding portions 11b & 21b. Therefore electrical short-circuiting can be prevented.

Even when the protruding lengths of the protruding portions 11d & 21d are set longer than those of the protruding portions 11b & 21b, the same effect can be obtained.

Figure 7:
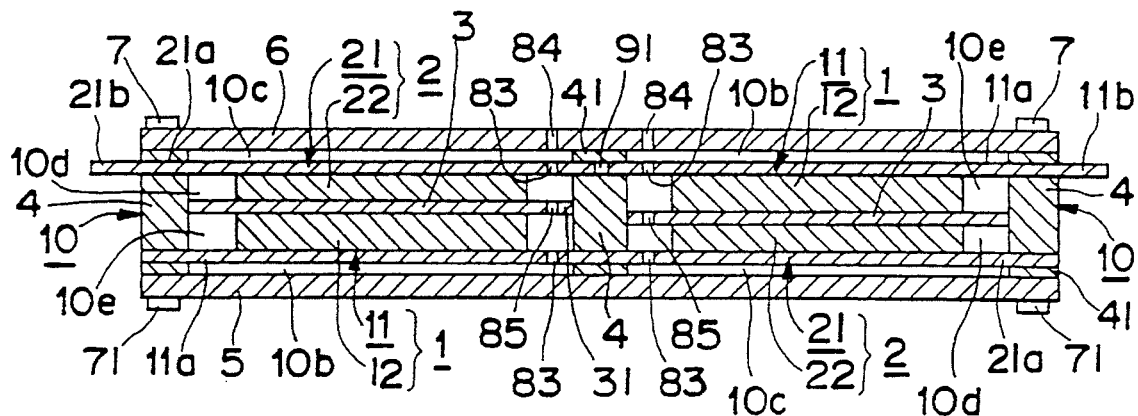
FIG. 7 is a sectional side view of a lead acid storage battery of embodiment 6.

FIG. 7 is the sectional side view showing the lead acid storage battery of a sixth embodiment. In this lead acid storage battery, two cells 10 installed side-by-side with one cell turned upside down relative to the other cell are held between the covers 5 & 6 and tightened together by the bolts 7 and the nuts 71. The positive current collector plate 11 of left cell 10 and the negative current collector plate 21 of right cell 10 are connected to each other by being composed of one current collector plate. The negative current collector plate 21 of left cell 10 is partitioned from the positive current collector plate 11 of right cell 10 by a clearance 91. Therefore, the two cells 10 are connected to each other in series. Other compositions are the same with those of the third embodiment (FIG. 4).

According to the lead acid storage battery having the above structure, the work involved in connecting the two cells becomes unnecessary because connection of cells is done simultaneously with the construction of two cells 10. In this way, a multi-cell lead acid storage battery requiring no cell connection work can be provided. In addition, the problem of increases in volume and electrical resistance caused by the connecting conductor between cells can be solved. A demand for installing a high-capacity battery within a narrow space can be satisfied effectively.

Naturally, three or more cells can be connected in series by installing them side by side in the same structure of this embodiment, so that the battery capacity can be increased easily.

Figure 8:
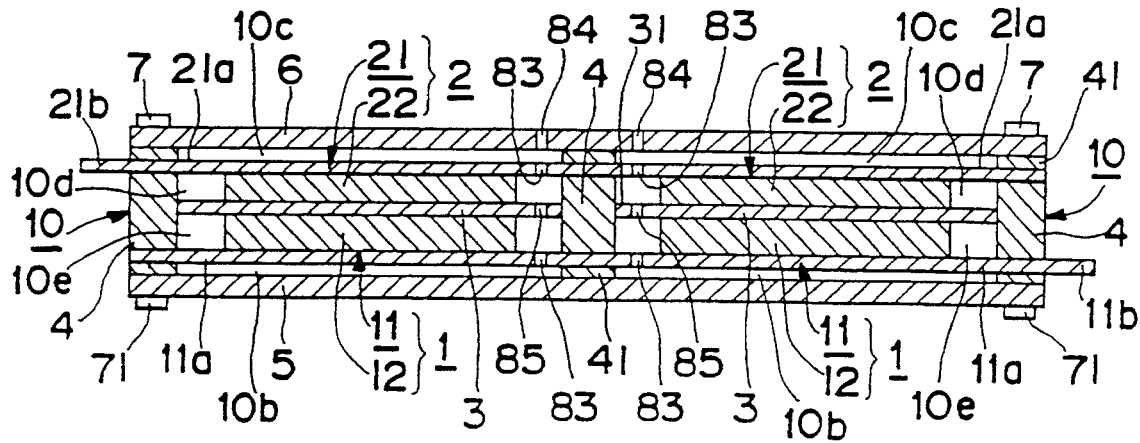
FIG. 8 is a sectional side view of a lead acid storage battery of embodiment 7.

FIG. 8 is the sectional side view showing the lead acid storage battery of a seventh embodiment. In this lead acid storage battery, two cells 10 are installed side by side. Differing from the case of the sixth embodiment (FIG. 7), however, these cells are connected in parallel to each other. Namely, the two cells 10 are installed side by side in the same upright positions. The positive current collector plates 11 of the both cells 10 are connected to each other by being composed of one current collector plate, and the negative current collector plates 21 of the both cells 10 are also connected to each other by being composed of one current collector plate.

Even in the lead acid storage battery having the above structure, the same effect as that of the sixth embodiment can be obtained.

Figure 9:
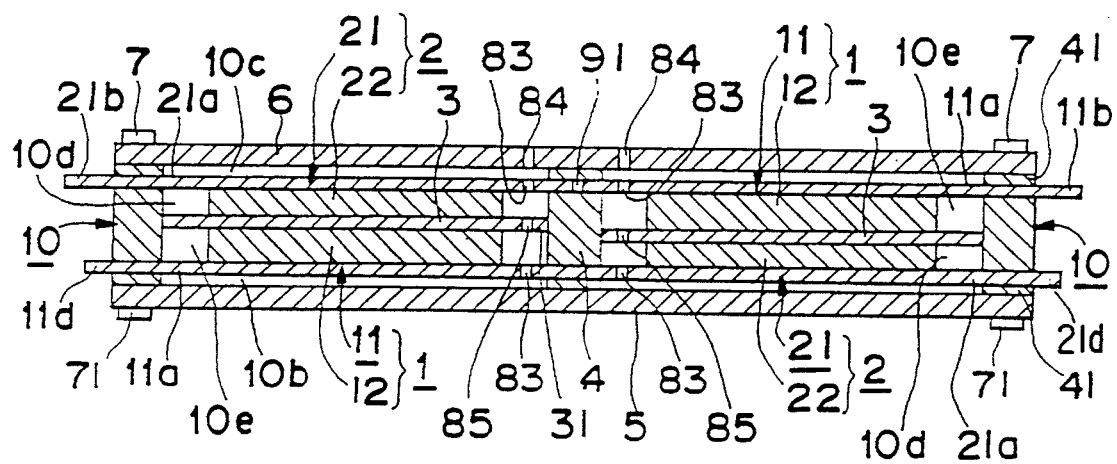
FIG. 9 is a sectional side view of a lead acid storage battery of embodiment 8.

FIG. 9 is the sectional side view showing the lead acid storage battery of eighth embodiment. In this lead acid storage battery, the peripheral edges 11a & 21a of current collector plate not composing the terminals protrude out of the gasket 4 (protruding portions 11d & 21d). Namely, the structure of the sixth embodiment is combined with that of the fifth embodiment, in this lead acid storage battery.

According to the lead acid storage battery having the above structure, the same effects as those of the fifth and sixth embodiments can be obtained.

Lead acid storage batteries of the sixth and eighth embodiments having 118 mm width, 174 mm length, 17 mm height, 5.5 Ah and 4 V, and a conventional lead acid storage battery having the same capacity were made up and the heat releasing characteristics of them were investigated. The heat releasing tests were done under the following conditions. Results are listed in Table 1.

Conditions: The batteries were surrounded by heat insulating materials in consideration of their usual working environments of being incorporated in various instruments. They were discharged at an ambient temperature of 30° C. and a discharging current of 3 C (C: time-rate capacity) down to 1.3 V/cell, and charged at a charging current of 0.1 C up to 115% of discharge capacity. Assuming this charge/discharge cycle as one cycle, the batteries were subjected to 10 cycles and the rises of battery temperature were measured.

TABLE 1

| Battery | Temperature rise (°C.) |
| --- | --- |
| sixth embodiment | 4 |
| eigth embodiment | 2 |
| Conventional | 8 |

As is obvious from Table 1, the heat releasing characteristics of the sixth and eighth embodiments are better than that of the conventional battery. Further, the heat releasing characteristic of the battery of the eighth embodiment is better than that of the battery of the sixth embodiment. The reason is that a part functioning as a heat releasing fin does not exist in the conventional battery. However, the protruding portions 11b & 21b function as heat releasing fins in the sixth embodiment and the protruding portions 11d & 21d in addition to the protruding portions 11b & 21b function as heat releasing fins in the eighth embodiment.

Figure 10:
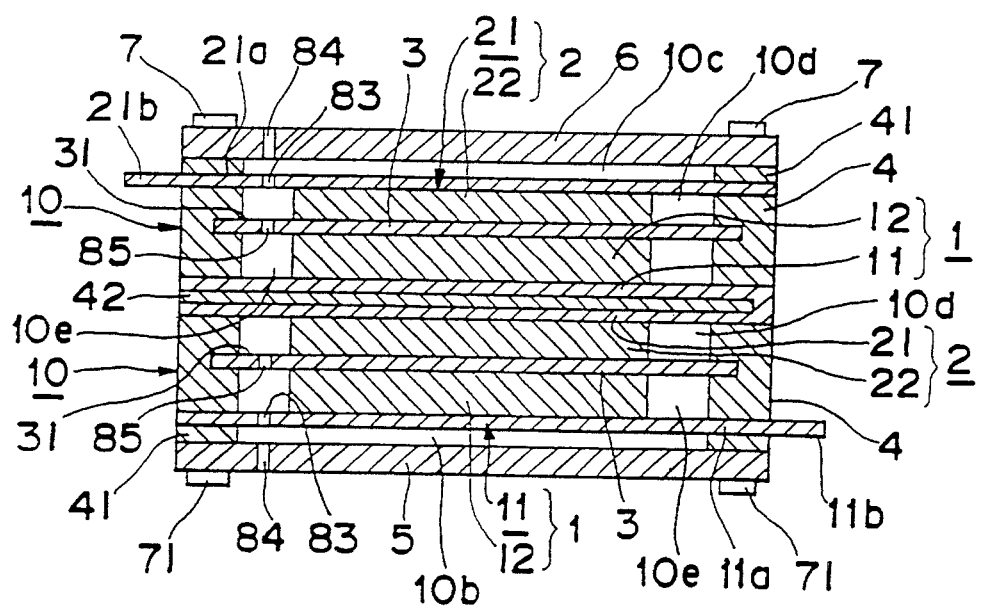
FIG. 10 is a sectional side view of a lead acid storage battery of embodiment 9.

FIG. 10 is the sectional side view showing the lead acid storage battery of ninth embodiment. In this lead acid storage battery, two laminated cells 10 are held between the covers 5 & 6 and integrated by the bolts 7 and the nuts 71. The positive current collector plate 11 of upper cell 10 and the negative current collector plate 21 of lower cell 10 are composed integrally by bending one current collector plate. Therefore, both of the current collector plates 11 & 21 are connected to each other. Consequently, the two cells 10 are connected in series with each other. A gasket 42 for insulation is put between both of the current collector plates 11 & 21. Other compositions are the same with those of the fourth embodiment.

According to the lead acid storage battery having the above structure, same effect as that of the sixth embodiment can be obtained.

Naturally, three or more cells can be laminated and connected in series with each other in the same structure of this embodiment, so that the battery capacity can be increased easily.

Figure 11:
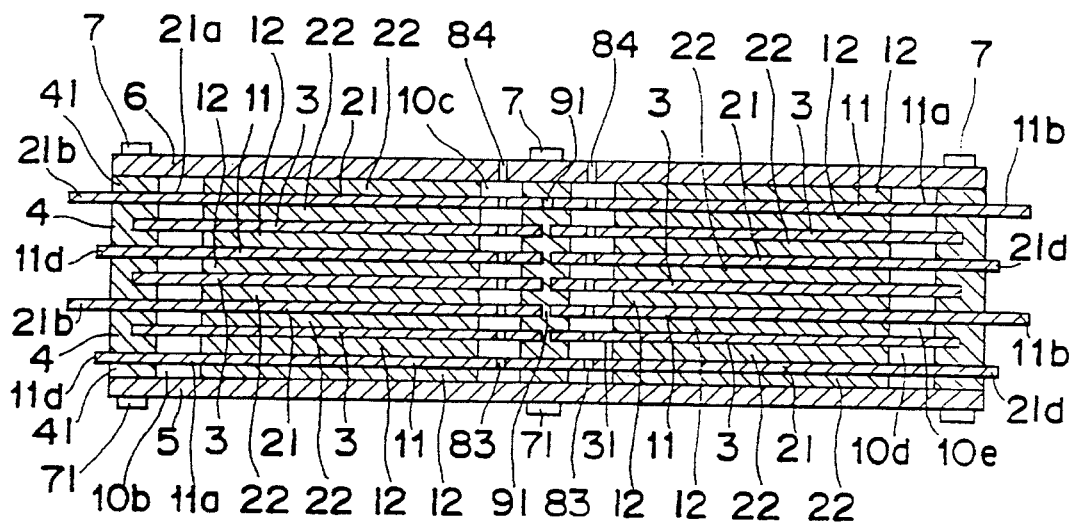
FIG. 11 is a sectional side view of a lead acid storage battery of embodiment 10.
Figure 12:
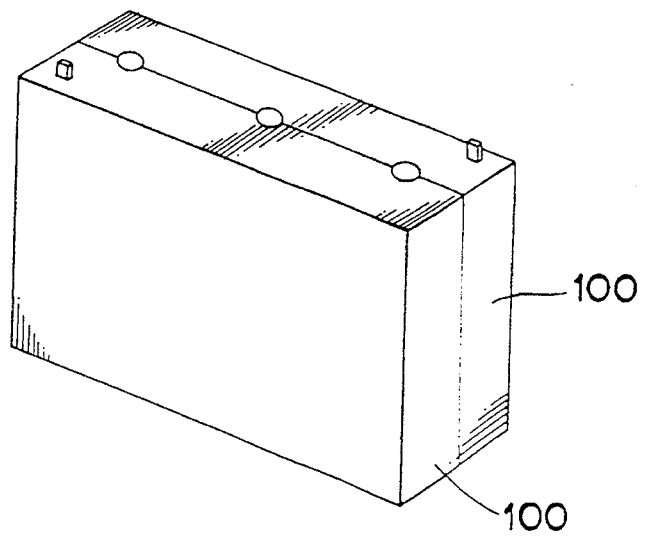
FIG. 12 is a perspective view showing a conventional mono-block-type sealed-type lead acid storage battery.
Figure 13:
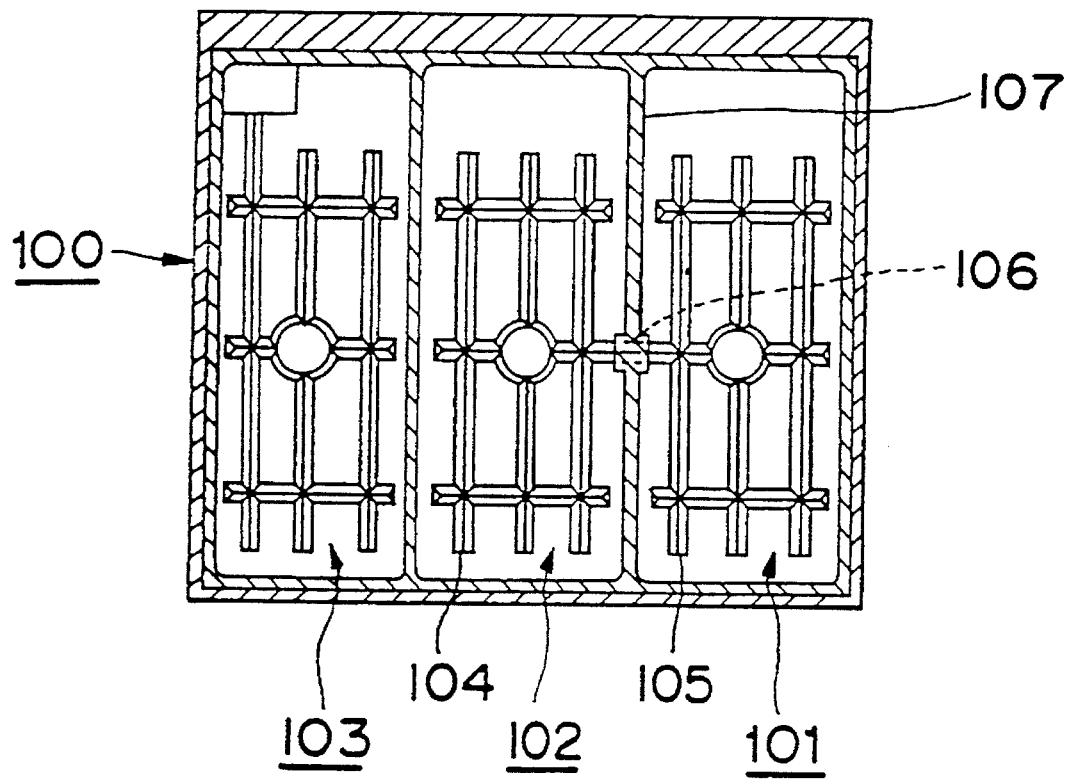
FIG. 13 is a sectional side view of the lead acid storage battery of FIG. 12.

FIG. 11 is the sectional side view showing the lead acid storage battery of a tenth embodiment. In this lead acid storage battery; the positive plate 1, the separator 3, the gasket 4 and the negative plate 2 are laminated so that assembled bodies comprising two cells 10 are laminated in two stages. The plates 1 & 2 have the active material layers 12 & 22 on both surfaces of the current collector plates 11 & 21. Other compositions are the same with those of the eighth embodiment (FIG. 9).

According to the lead acid storage battery having the above structure, the battery capacity can be increased easily.

What is claimed is:

1. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which the cell space comprises one space, and wherein an exhaust port extending between the cell space and the outside of the cell is provided in at least one of the positive current collector plate or the negative current collector plate.

2. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which the cell space comprises two chambers partitioned by the separator, and wherein an exhaust port extending between the cell space and the outside of the cell is provided in at least one of the positive current collector plate or the negative current collector plate, and wherein an air vent hole between the two chambers extends through the separator.

3. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which the gasket is formed integrally with the separator.

4. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which multiple cells are put in side-by-side positions in alternating upright and upside down positions, and wherein a positive current collector plate of each cell is connected to a negative current collector plate of an adjoining cell so that the cells are connected in series, and wherein the current collector plates connected to each other comprise one current collector plate.

5. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which multiple cells are installed in side-by-side positions in the same upright positions, and wherein a positive current collector plate of each cell is connected to a positive current collector plate of an adjoining cell, and a negative current collector plate of each cell is connected to a negative current collector plate of an adjoining cell, and wherein the current collector plates connected to each other comprise one current collector plate.

6. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which multiple cells are installed in laminated positions adjoining in a vertical direction in the same upright positions; wherein a current collector plate located at an upper side of a lower cell and a current collector plate located at a lower side of an upper cell are made integrally and connected to each other by bending one current collector plate.

7. A lead acid storage battery having a cell which comprises a positive plate comprising a positive active material layer and a positive current collector plate, a negative plate comprising a negative active material layer and a negative current collector plate, a separator and a frame-shaped gasket wherein in the cell, the positive plate and the negative plate are laminated with the gasket put between them, the gasket is in contact with peripheral edges of each of the positive current collector plate and the negative current collector plate, and the positive active material layer and the negative active material layer are located in a cell space surrounded by the positive current collector plate, the negative current collector plate, and the gasket with the separator put between the positive active material layer and the negative active material layer; and in which the battery has multiple laminated assemblies comprising multiple cells put side-by-side.

* * * * *